(No Model.)  W. H. COWARD.  2 Sheets—Sheet 2.

PULVERIZING MACHINE.

No. 413,388.  Patented Oct. 22, 1889.

WITNESSES:
C. Sedgwick
J. M. Ritter

INVENTOR:
W. H. Coward
BY Munn & Co.
ATTORNEYS.

UNITED STATES PATENT OFFICE.

WILLIAM HENRY COWARD, OF BATH, COUNTY OF SOMERSET, ENGLAND.

PULVERIZING-MACHINE.

SPECIFICATION forming part of Letters Patent No. 413,388, dated October 22, 1889.

Application filed November 30, 1888. Serial No. 292,173. (No model.) Patented in England September 6, 1888, No. 12,895.

*To all whom it may concern:*

Be it known that I, WILLIAM HENRY COWARD, of Newark House, Railway Place, Bath, in the county of Somerset, England, engineer and machinery broker, have invented new and useful Improvements in Pulverizing-Machines, (which have been patented in England, dated September 6, 1888, and numbered 12,895,) of which the following is a full, clear, and exact description.

My invention relates to apparatus for crushing or pulverizing, consisting of a revolving drum having an edge runner rolling therein and provided with means for supplying the material to be crushed, and for removing the ground material in a continuous manner without interrupting the working of the machine, all as hereinafter fully described, and pointed out in the claims.

Reference is to be had to the accompanying drawings, forming part of this specification, wherein—

Figure 1:
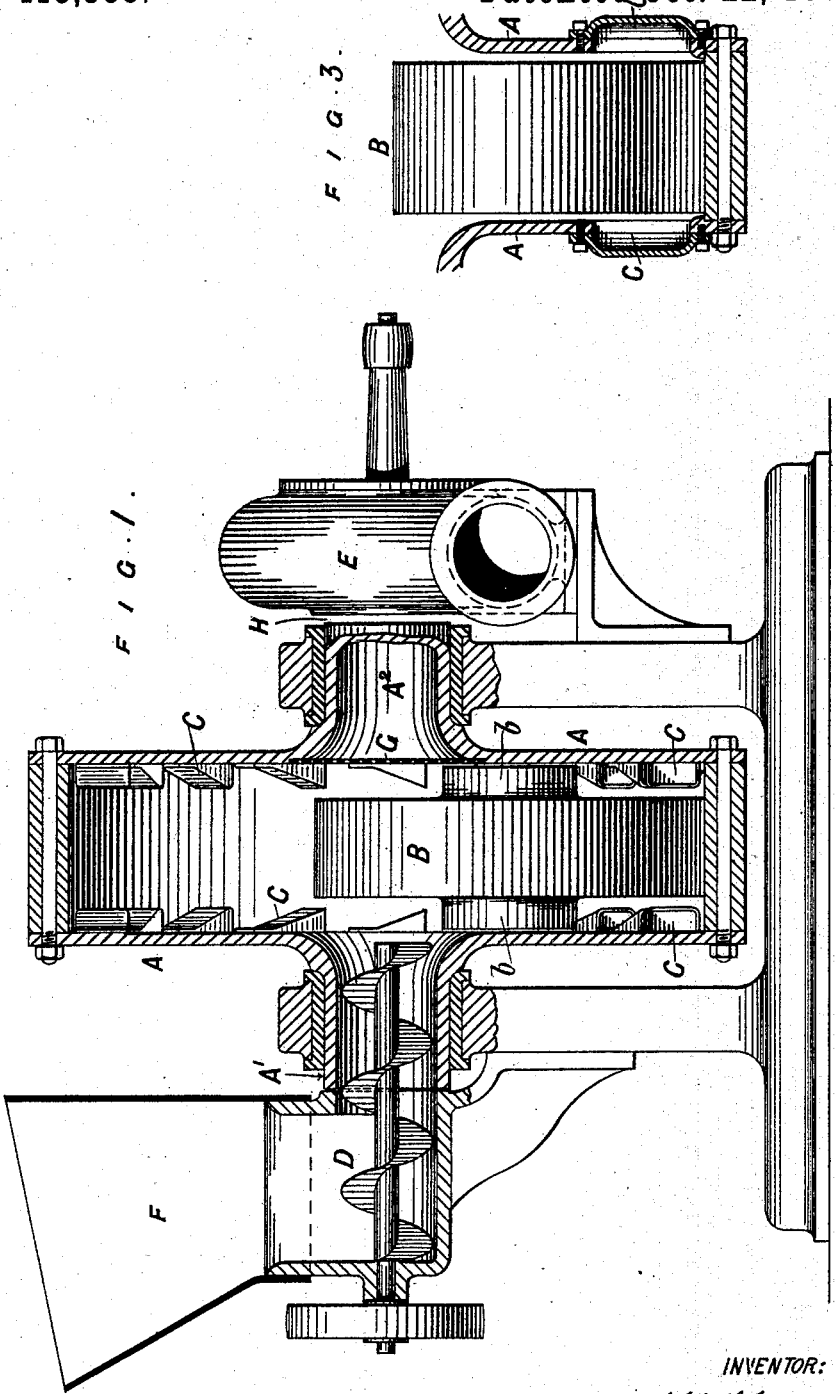
Figure 2:
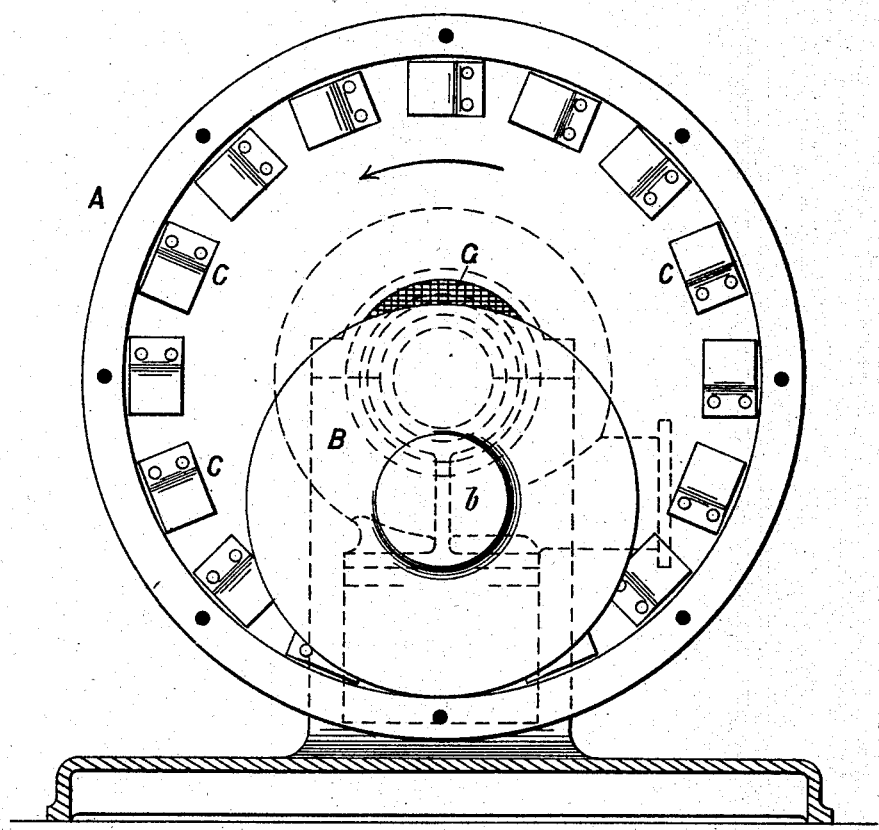

Figure 1 is a longitudinal section, and Fig. 2 a cross-section, of the machine. Fig. 3 shows a modification.

The same letters of reference indicate the same parts in all the figures.

The pulverizer consists of a flat-sided drum A, mounted to rotate on a horizontal axis and containing a heavy edge runner B, which is loose within the drum and remains at about the lower part thereof while the drum revolves, the runner thus being caused to roll in contact with the periphery of the drum, and to crush or pulverize the material brought under its action. The edge runner has central bosses $b$, which fit between the ends of the drum and keep the runner steady, the remainder of the edge runner being narrower than the drum to afford space for cups C, which are fixed to the inside of the ends of the drum. These cups are preferably of the wedge shape shown, and are disposed wholly around the inner faces of the drum, their mouths facing the direction in which the drum rotates, so that in revolving with the drum they will carry up the partially-ground material and let it fall back again through a current of air passing across the drum. The cups C are arranged out of the path of the edge runner, so to prevent them from being clogged by the material. The cups might, however, be pockets fixed to the outside of the drum over apertures in the ends thereof, as shown in Fig. 3, in which case the edge runner would be of full width at its periphery, but should be of less than half the diameter of the drum, so as to leave a clear passage through the trunnions.

The casing A is mounted upon hollow trunnions A' A², supported in bearings in a suitable frame, and to the one trunnion is applied a screw conveyer D in connection with a hopper F, whereby the material to be operated on is fed from the hopper into the casing A. To the other trunnion is connected an exhaust-fan E, of any suitable kind, whereby a current of air is continuously maintained through the drum for the purpose of winnowing the partially-crushed material falling from the cups or lifters C, the finer particles being carried off and deposited in a chamber. Instead of, or in addition to, an exhaust-current, air may be forced through the spindle of the conveyer D, which is made hollow for the purpose of admitting air.

G is a diaphragm of gauze stretched across the outlet-trunnion to arrest material which has not been sufficiently reduced, and prevent the same being carried into the fan.

At H there is an opening for the purpose of admitting air to the fan and avoiding clogging.

The drum A is slowly revolved by a belt or gear applied to its periphery in order to produce the rolling motion of the edge runner, and the fan E and conveyer D are driven at suitable speeds.

Having now particularly described and ascertained the nature of the said invention, and in what manner the same is to be performed, I declare that what I claim is—

1. A pulverizer comprising the revolving drum A, having hollow trunnions and provided with a series of wedge-shaped cups disposed around its inner faces, the edge runner B narrower than the drum and provided with bosses $b$ for steadying it in the said drum, a fan or blower connected to one of the trunnions of the drum, and a screw-conveyer in the other trunnion of the drum, substantially as herein shown and described.

2. A pulverizer comprising the revolving drum A, having hollow trunnions A' A² and provided with the wedge-shaped cups C around its inner faces, the edge runner B, provided with the bosses $b$, the screw conveyer D in the trunnion A', the exhaust-fan E, connected to the trunnion A², and the gauze diaphragm G across the trunnion A², substantially as herein shown and described.

The foregoing specification of my improvements in apparatus for crushing or pulverizing ores, cements, and other substances signed by me this 10th day of November, 1888.

WILLIAM HENRY COWARD.

Witnesses:
    H. G. BRIDLE,
    *Clerk to Messrs. Inman, Adams & Ihring, Solicitors, Bath.*
    FERDINAND E. ROBERTS,
    *Clerk to Mr. J. Allon Tacker, Solicitor, Bath.*